3,031,317
PRINTING INK AND METHOD OF MULTI-COLOR PRINTING
Charles A. Spevacek, Kokomo, Ind., assignor to The Cuneo Press, Inc., Chicago, Ill., a corporation of Illinois
No Drawing. Filed Oct. 5, 1959, Ser. No. 844,210
7 Claims. (Cl. 106—23)

My invention relates to printing ink additive and method of multi-color printing.

I propose the use of a dye as an additive to, not as a substitute for, the pigment in multi-color printing ink. Dyes have been used as a substitute for pigment in printer's ink with little if any commercial success but my invention is based on the proposition that under certain circumstances a dye additive may be used with benefit to the multi-color printing process.

My invention may well be illustrated by the use of a red dye base added to a red printer's ink which thereafter covers the yellow which has previously been printed on the surface so that the red dye actually colors the under-printed yellow a deeper red. This can be done with a thinner film of red ink that has not been made more opaque by the dye.

In this instance, an ordinary heatset multi-color red can be fortified with a dye which will permit not only covering of the first down yellow but will actually color the under-printed yellow a deeper red than an even thinner film of red ink than ordinarily used.

The fact that a thinner film of ink can be used makes it possible to print screen areas in line with solid areas with much more clarity, sharpness and lightness.

I illustrate my invention in connection with an oil soluble red dye added to a heatset letterpress process multi-color ink but it will be obvious that the other colors might be used and that the printing could be by other than heatset multi-color process.

For convenience I have illustrated my invention below in connection with process heatset multi-color work where the yellow is printed first down, the red second down, the blue third down and the black fourth down though other sequences might be used.

The dye base additive I propose is favorably priced to compete with the usual Phloxine Red pigment used in heatset multi-color process red inks, and does not increase either the material or manufacturing costs of the ink. Its action over first down yellow in fact permits the use of lesser strength red inks, further permitting lower material costs.

In process heatset multi-color work where the yellow is printed first down, the red second down, the blue third down and the black fourth down, it is usually difficult to obtain the proper yellow-red combination of ink film so that the red over yellow solid areas will be red enough without carrying an excessive film of red ink which distorts the screen areas running in line with the solid areas. In most instances if the red ink is carried full enough for the red over yellow solids, the in-line screen areas will be flooded or over-inked. The use of the dye additive which I proposce prevents or minimizes this difficulty because a much thinner film of red ink may be used to cover the red over yellow areas.

In actual press make ready procedures, when the red ink does not contain my dye additive, it often becomes necessary to resort to excessive distortion of the plate to achieve the lightness required in the red dot areas. Use of my dye additive helps relieve the need for such excessive distortion, permitting printing from a more level plate.

The usual heatset multi-color process red printing ink is made from Phloxine Red pigment either flushed or dry ground into a varnish consisting of limed resin, zincated resin, or pentaerithritol esters of resin in aliphatic petroleum solvents in the 470 to 565 degrees F. boiling ranges. An ink made this way is generally made a shade bluer than the oleoresinous base type red used by the engraver in proofing the progressive proofs used as color guides for matching on the heatset multi-color production presses. The reason for this shade difference is that the extra blueness is required to achieve the red over yellow combination of the progressive proof. The blueness has a tendency to create dirtier screen areas in combination with the other colors, and is, of course, objectionable. Use of my dye additive in process heatset multi-color reds permits the use of shades more parallel to those used by the engraver and consequently, a closer reproduction becomes possible. Because of this and the lesser film of red ink required, halftone areas print cleaner with less distortion than with reds that do not contain the dye additive.

An oil soluble red dye suitable for this application is Du Pont's oil red dye. It is, as per their literature, "characterized as belonging to Color Index 26105—Solvent Red 24, in the new 1956 Color Index—Second Edition. It is chemically recognized to be the resultant product obtained from coupling diazotized aminoazo benzene with beta naphthol. The color is water insoluble—an obvious advantage—but exhibits varying degrees of solubility in many hydrocarbon solvents and paraffinic materials and is quite soluble in the aromatic hydrocarbon series compounds, such as toluene and xylene.

The dye while only partially soluble is sufficiently soluble in cold aliphatic petroleum solvents such as used in heatset printing ink so that solubility is completed when heat is applied and it is this partial solubility which explains the lack of proper color when cold and the dramatic color change when heated.

When the dye is ground into a base of calcium carbonate and heatset varnish, it creates a base that is unlike the shade of Phloxine Red. A print, or draw-down of the dye base indicates a color not at all suitable for use in process reds, until the print or draw-down is heated. Upon heating, the color changes darmatically to a relatively bright, vivid red, not unlike that of Phloxine Red pigment. Heat in the laboratory is applied by means of a hot plate. The heat in the drying ovens of the production press is just as effective because the web temperature is high enough to create the color change required.

A suitable dye base may be prepared as follows:

|   | Percent |
|---|---|
| Heatset varnish (zincated resin, 470 degrees F. boiling range aliphatic petroleum solvent) | 14.9 |
| Heatset varnish (gel compound—aluminum octoate and pentaerythritol ester of resin—in 470 degrees F. boiling range aliphatic petroleum solvent) | 46.0 |
| 590 degrees F. aliphatic petroleum solvent | 7.7 |
| 535 degrees F. boiling range aliphatic petroleum solvent | 2.9 |
| Dry calcium carbonate | 23.6 |
| Du Pont oil red dye | 4.9 |
|   | 100.0 |

This is thoroughly blended and ground on a water cooled three roller ink mill to a fineness equal to that of a fine printing ink (No. 3 on the NPIRI fineness of grind gauge).

Cost of this dye base is relatively low compared to Phloxine Red bases, although tinctorially, as determined by bleaching, it is not comparable. The tinctorial strength, however, is not the criterion as related to pigment strength, for the change of color due to application of heat, and the resultant actual coloring of the under-printed yellow is accomplished satisfactorily without regard to the apparent tinctorial strength of the dye base. This is, in fact, the essence of my invention, the dye is not intended to be a replacement, or substitution for the usual pigment. It is rather an additive which improves the covering power of the ink without impairing its strength of transparence nor increasing either material or manufacturing costs.

The following is an example of the amount of dye base I use to illustrate my invention:

100.00 Regular heatset multi-color process red printing ink
15.00 Dye base
———
115.00

This amount is sufficient to produce a much more intense shade of red in the red over yellow areas than is possible with the regular heatset multi-color process red ink without the dye base.

Although the dye base, and the ink with dye base exhibit a marked tendency to sublime into the atmosphere when heated excessively in the laboratory, actual press production runs on magazine printing has not shown even the slightest amount of sublimation into the drying ovens or outside atmosphere despite usage of tons of ink containing the dye base additive. Even when the ratio of dye base was increased to forty percent, as added to the ink, there is no sublimation. Even at the forty percent rate, there was no evidence of strike through or stain on the printed sheet after several months of aging the printed sheet.

Laboratory tests suggest that both the sublimation and strike through stain would occur. These tests are contradicted by actual usage on the production press. It can only be theorized why this condition exists for no laboratory equipment is available to exactly reproduce the press web speed and heat conditions existing in the production press and its drying ovens. The most logical theory is that the dye is so small in volume, and so well dispersed and surrounded in the ink structure by resin and pigment and that the actual time in the production press drying oven is so short that it is unable to escape the ink film or penetrate the stock, any further than the ink itself can.

The dye is preferably added to the ink in the form of a dye base. It might, however, with certain inks, be added directly.

In general, therefore, I propose to reinforce if not the first ink laid down, at least one of the following inks laid down with a dye which will tint the layer previously laid down so as to modify its color and do this with an ink which has been reinforced by color rather than by thickness.

Increased color effect has in the past been accomplished by using a thicker ink layer or printing plate distortion but as above pointed out that has many obvious disadvantages. I propose to reinforce the ink by the use of not more pigment on the surface but by the use of a translucent, transparent dye.

The dye and the dye base will not serve as a substitute for ink because it is translucent or transparent. All it can do is to tint some other ink after the ink is laid down and it is for that purpose and that purpose alone that I propose the use of my dye which makes it possible to intensify the dye and color effect without smudging or over printing. It is important that the dye be one which changes in color or at least in color done under heatset. The ink and the dye and the dye base which I propose are limited in their usefulness to letterpress and would not be satisfactory and would not work or produce the desired effect in gravure of flexo inks.

I claim:

1. A red letter press printing ink including red pigment in a vehicle containing resins and an aliphatic organic solvent with a boiling point range from about 470 degrees to about 565 degrees F., and an oil soluble red dye partially soluble in said solvent when cold and completely soluble in said solvent when heated.

2. A red letter press printing ink including red pigment in a vehicle containing resins and an aliphatic organic solvent with a boiling point range from 470 degrees to 565 degrees F., and a red dye which is amino-azobenzene-β-naphthol, said dye characterized by being partially soluble in the solvent when cold and completely soluble when the solvent is heated.

3. A dye base additive for letter press printer's ink which includes heatset varnish containing resins and aliphatic petroleum solvents having a boiling point range from about 470 degrees to about 565 degrees F., and an oil soluble red dye present at a level of about 5 percent in said heat set varnish, said dye characterized by being partially soluble in said solvent when cold and completely soluble when said solvent is heated.

4. A red letter press printing ink including about 100 parts of conventional heatset multi-color process red printing ink and about 15 parts of a red dye base, said red dye base containing, in turn, about 5 percent of a red dye in a vehicle having resins and aliphatic petroleum solvents within a boiling point range of from about 470 degrees to about 565 degrees F., said dye characterized by being partially soluble in the ink when cold and completely soluble when the ink is heated.

5. The method of heatset multi-color letter press process printing which consists in covering an under-printed yellow with a red layer which includes pigment, an oil soluble red dye, and an aliphatic organic solvent, said dye partially soluble in said solvent when cold, and applying heat, whereby the color of the red dye changes.

6. The method of heatset multi-color letter press process printing which consists in covering an under-printed yellow with a red layer of pigmented ink containing an aliphatic organic solvent to which has been added an oil soluble red dye base, said base partially soluble in the solvent when cold, and applying heat, whereby the color of the red dye base changes.

7. A heatset letter press printer's ink which includes a red color pigment, an aliphatic organic solvent, and a red dye, said dye partially soluble in the solvent when cold and completely soluble when heated, whereby a color change occurs.

References Cited in the file of this patent

UNITED STATES PATENTS

| | | |
|---|---|---|
| 2,326,321 | Barmeier | Aug. 10, 1943 |
| 2,567,964 | Petke | Sept. 18, 1951 |
| 2,580,205 | Voet | Dec. 25, 1951 |
| 2,966,417 | Anderson | Dec. 27, 1960 |